United States Patent [19]
Broemer et al.

[11] 3,929,495
[45] Dec. 30, 1975

[54] OPTICAL BORATE GLASS OF HIGH CHEMICAL RESISTANCE AND PROCESS OF MAKING SAME

[75] Inventors: Heinz Broemer, Hermannstein; Norbert Meinert, Wetzlar, both of Germany

[73] Assignee: Ernst Leitz G.m.b.H., Wetzlar, Germany

[22] Filed: May 15, 1973

[21] Appl. No.: 360,418

[30] Foreign Application Priority Data
May 15, 1972 Germany.................... 2223564

[52] U.S. Cl............................ 106/47 Q; 106/47 R
[51] Int. Cl.². ... C03C 3/14; C03C 3/00; C03C 3/30
[58] Field of Search................. 106/47 Q, 47 R

[56] References Cited
UNITED STATES PATENTS

| | | | |
|---|---|---|---|
| 2,511,228 | 6/1950 | Sun et al............... | 106/47 Q |
| 2,996,392 | 8/1961 | Broemer et al........ | 106/47 Q |
| 3,149,984 | 9/1964 | Faulstich............... | 106/47 R |
| 3,307,929 | 3/1967 | Trap...................... | 106/47 R |
| 3,480,453 | 11/1969 | Reid et al.............. | 106/47 R |
| 3,486,915 | 12/1969 | Broemer et al....... | 106/47 R |
| 3,510,325 | 5/1970 | Broemer et al....... | 106/47 R |

FOREIGN PATENTS OR APPLICATIONS

| | | | |
|---|---|---|---|
| 863,352 | 3/1961 | United Kingdom........ | 106/47 Q |
| 4,424,420 | 10/1969 | Japan......................... | 106/47 Q |

*Primary Examiner*—Winston A. Douglas
*Assistant Examiner*—Mark Bell
*Attorney, Agent, or Firm*—Erich M. H. Radde

[57] ABSTRACT

An optical borate glass of high chemical resistance, with negative anomalous partial dispersion, refraction index $n_e$ between 1,65 and 1,79, and Abbe number $\nu_e$ between 40 and 30 is composed of boron trioxide, lead oxide, and aluminum oxide. It may additionally contain lithium, sodium, and/or potassium oxides, zinc oxide, zirconium dioxide, tantalum pentoxide, and, if desired, antimony trioxide and/or bismuthum trioxide.

23 Claims, No Drawings

OPTICAL BORATE GLASS OF HIGH CHEMICAL RESISTANCE AND PROCESS OF MAKING SAME

BACKGROUND OF THE INVENTION

1 Field of the Invention

The present invention relates to an optical borate glass and more particularly to an optical borate glass of high chemical resistance with negative anomalous partial dispersion, refractive indices $n_e$ between 1.65 and 1.79, and Abbe numbers $\nu_e$ between 40 and 30, and to a method or manufacturing same.

2 Description of the Prior Art

Recently the need for optical glass of a high index of refraction and a low Abbe number which, as additional parameter, have a negative anomalous partial dispersion, has increased greatly due to recalculations of optical systems. In this connection, it is of decisive importance to improve the possibilities of correction of the optical systems by the use of optical glasses of predetermined anomalous partial dispersion. Details concerning the importance, the use, and the nomenclature of glasses having anomalous partial dispersion values are set forth in German Pat. No. 1,496,563.

However, it has proven to be very difficult to produce, by melting, glasses having the aforesaid physical properties because they do not possess other properties which are absolutely required for utilizing them in high-grade optical systems, such as, for instance, lack of color and high chemical resistance.

Glasses of this type which have become known heretofore either have insufficient chemical resistance or else a disturbing color cast. Due to their insufficient chemical resistance, they are not only unsuitable for use as outer lenses in modern optical systems, but they are also responsible for causing a very high percentage of rejects when mechanically assembling them.

SUMMARY OF THE INVENTION

It is one object of the present invention to provide an optical borate glass of superior chemical resistance which, in addition to a refractive index $n_e$ between 1.65 and 1.79 and an Abbe number $\nu_e$ between 40 and 30, also has a negative anomalous partial dispersion but which is free of the disadvantages of the known glasses.

Another object of the present invention is to provide a simple and effective process of making such a valuable optical borate glass.

Other objects of the present invention and advantageous features thereof will become apparent as the description proceeds.

In principle these objects are achieved by providing a glass which contains between 26 and 39 percent, by weight, of boron trioxide ($B_2O_3$), between 32 and 57 percent, by weight, of lead oxide (PbO), and between 5 and 19 percent, by weight, of aluminum oxide ($Al_2O_3$).

According to a specific embodiment of the present invention the glass can, in addition, contain the following components in the quantities indicated:

Between 0.2 and 3.0 percent, by weight, of at least one of the oxides of the alkali metals lithium ($Li_2O$), sodium ($Na_2O$), and potassium ($K_2O$), between 0.8 and 8.0 percent, by weight, of zinc oxide (ZnO), between 2.0 and 6.0 percent, by weight, of zirconium oxide ($ZrO_2$), between 2 and 15 percent, by weight, of tantalum oxide ($Ta_2O_5$), and between 8 and 16 percent, by weight, of antimony oxide ($Sb_2O_3$) and/or bismuthum oxide ($Bi_2O_3$).

The process of manufacturing the glasses of the present invention is characterized by melting down mixtures which consist of the chemical components indicated in the preceding paragraphs in the weight percentages also indicated therein.

The glasses according to the present invention have the advantage that they are of superior chemical resistance so that the possibilities of their use in modern optical systems are considerably broadened. In addition thereto the glasses can be worked much more easily. This results in a simplification of manufacture which, in the final analysis, leads to lower manufacturing costs.

DESCRIPTION OF THE PREFERRED EMBODIMENTS

The following examples serve to illustrate the present invention without, however, limiting the same thereto. Thus a number of glasses according to the present invention are given in the following Tables, The refractive index $n_e$, the Abbe number $\nu_e$ (reciprocal of the dispersion), and the amount of the anomalous partial dispersion $\Delta\nu_e$ are also indicated in said Tables.

In Table 1, examples are given for the pure ternary system $B_2O_3$ -PbO - $Al_2O_3$.

Table 1

| Glass No.: | (weight %) | | |
|---|---|---|---|
| | 1 | 2 | 3 |
| $B_2O_3$ | 38.5 | 38.5 | 38.5 |
| PbO | 56.5 | 51.5 | 46.5 |
| $Al_2O_3$ | 5.0 | 10.0 | 15.0 |
| $n_e$ | 1.7241 | 1.6938 | 1.6709 |
| $\nu_e$ | 34.5 | 36.4 | 38.2 |
| $\Delta\nu_e$ | −2.6 | −3.3 | −3.5 |

In these compositions the proportion of boron trioxide ($B_2O_3$) was left constant in each case while that of aluminum oxide ($Al_2O_3$) was increased at the expense of the proportion of lead oxide (PbO) by 5 percent, by weight, each time. Thereby, in addition to a decrease in the refractive index and a corresponding increase in the Abbe number, the absolute value of the anomalous partial dispersion increases.

In Table 2, the example given in Table 1 under Glass No. 3 is modified by partially replacing lead oxide by an alkali metal oxide.

Table 2

| Glass No.: | (weight %) | | |
|---|---|---|---|
| | 4 | 5 | 6 |
| $B_2O_3$ | 38.5 | 38.5 | 38.5 |
| PbO | 44.5 | 44.5 | 44.5 |
| $Al_2O_3$ | 15.0 | 15.0 | 15.0 |
| $Li_2O$ | 2.0 | — | — |
| $Na_2O$ | — | 2.0 | — |
| $K_2O$ | — | — | 2.0 |
| $n_e$ | 1.6686 | 1.6563 | 1.6541 |
| $\nu_e$ | 38.5 | 38.7 | 38.7 |
| $\Delta\nu_e$ | −3.7 | −3.7 | −3.5 |

It is evident that with such partial substitutions, a predetermined fine adjustment of the optical position parameters can be effected.

Of course, it is understood that the use of the alkali metal oxides is not limited to the addition of a single alkali metal oxide only; rather, it is also possible to add two or more oxides together for partially replacing the lead oxide.

In Table 3, zinc oxide is added to the three component starting glass. In this case also - starting from the composition given as Glass No. 3 in Table 1 -- the zinc oxide (ZnO) is substituted in part for equal percentages, by weight, of lead oxide (PbO).

Table 3

| Glass No.: | (weight %) | | |
|---|---|---|---|
| | 7 | 8 | 9 |
| $B_2O_3$ | 38.5 | 38.5 | 38.5 |
| PbO | 42.5 | 40.5 | 38.5 |
| $Al_2O_3$ | 15.0 | 15.0 | 15.0 |
| ZnO | 4.0 | 6.0 | 8.0 |
| $n_e$ | 1.6691 | 1.6689 | 1.6659 |
| $\nu_e$ | 39.2 | 39.7 | 40.1 |
| $\Delta\nu_e$ | −4.2 | −3.6 | −3.9 |

Glass No 7 has the greatest negative anomalous partial dispersion of all the examples given. However, this does not mean that higher negative values for the $\Delta\nu_e$ - for instance, a value of −5.0 - would not be comprised by this invention.

In Table 4 tantalum pentoxide ($Ta_2O_5$) has been added as further component to the three component base glass while in Table 5 zirconium dioxide ($ZrO_2$) has also been added.

Table 4

| Glass No.: | (weight %) | | | | |
|---|---|---|---|---|---|
| | 10 | 11 | 12 | 13 | 14 |
| $B_2O_3$ | 35.0 | 35.0 | 30.0 | 30.0 | 26.0 |
| PbO | 45.0 | 45.0 | 50.0 | 50.0 | 57.0 |
| $Al_2O_3$ | 10.0 | 5.0 | 10.0 | 5.0 | 8.0 |
| $Ta_2O_5$ | 10.0 | 15.0 | 10.0 | 15.0 | 9.0 |
| $n_e$ | 1.7221 | 1.7414 | 1.7461 | 1.7766 | 1.7858 |
| $\nu_e$ | 34.5 | 33.4 | 32.9 | 31.3 | 30.0 |
| $\Delta\nu_e$ | −3.4 | −3.8 | −2.4 | −2.3 | −0.5 |

Table 5

| Glass No.: | (weight %) | | |
|---|---|---|---|
| | 15 | 16 | 17 |
| $B_2O_3$ | 35.0 | 31.0 | 29.0 |
| PbO | 45.0 | 45.0 | 45.0 |
| $Al_2O_3$ | 10.0 | 10.0 | 10.0 |
| $ZrO_2$ | 2.0 | 4.0 | 6.0 |
| $Ta_2O_5$ | 8.0 | 10.0 | 10.0 |

Table 5-continued

| Glass No.: | (weight %) | | |
|---|---|---|---|
| | 15 | 16 | 17 |
| $n_e$ | 1.7144 | 1.7435 | 1.7609 |
| $\nu_e$ | 35.3 | 33.7 | 33.1 |
| $\Delta\nu_e$ | −3.2 | −3.8 | −3.0 |

Thereby, the total proportion of the sum of zirconium dioxide plus tantalum pentoxide ($ZrO_2 + Ta_2O_5$) has been increased from 10.0 percent, by weight, in the composition of Example 15, to 14.0 percent, by weight, in the composition of Example 16, and finally to 16.0 percent, by weight, in the composition of Example 17, whereby the zirconium dioxide and tantalum pentoxide are substituted for the same proportion, by weight, of boron trioxide ($B_2O_3$). On the other hand, the weight percentages of lead oxide (PbO) and aluminum oxide ($Al_2O_3$) were left constant.

Finally, in Table 6, in addition to the replacement compounds zirconium dioxide ($ZrO_2$) and tantalum pentoxide ($Ta_2O_5$) mentioned heretofore, there are furthermore also used in addition antimony trioxide ($Sb_2O_3$) and bismuthum trioxide ($Bi_2O_3$), alone or in combination. As a result thereof further possibilities of combinations for the three optical parameters $n_e$, $\nu_e$, and $\Delta\nu_e$ are made available.

Table 6

| Glass No.: | (weight %) | | | | |
|---|---|---|---|---|---|
| | 18 | 19 | 20 | 21 | 22 |
| $B_2O_3$ | 33.5 | 33.5 | 31.0 | 31.0 | 31.0 |
| PbO | 42.5 | 42.5 | 40.0 | 40.0 | 32.0 |
| $Al_2O_3$ | 5.0 | 5.0 | 10.0 | 10.0 | 10.0 |
| $ZrO_2$ | 3.0 | 3.0 | 3.0 | 3.0 | 3.0 |
| $Ta_2O_5$ | 8.0 | 8.0 | 8.0 | 8.0 | 8.0 |
| $Sb_2O_3$ | 8.0 | — | 8.0 | — | 8.0 |
| $Bi_2O_3$ | — | 8.0 | — | 8.0 | 8.0 |
| $n_e$ | 1.7500 | 1.7652 | 1.7433 | 1.7513 | 1.7457 |
| $\nu_e$ | 32.7 | 32.3 | 33.0 | 32.9 | 32.6 |
| $\Delta\nu_e$ | −3.5 | −2.2 | −3.0 | −1.9 | −1.8 |

A preferred glass in accordance with the present invention which has the same optical properties as an ordinary commercial glass, but which in addition is also very stable chemically - in contradistinction to the known glass - is of the following composition (in percent by weight):

| Glass no. | 25 |
|---|---|
| $B_2O_3$ | 34.7 |
| PbO | 39.0 |
| $Al_2O_3$ | 18.5 |
| $Li_2O$ | 0.2 |
| $Na_2O$ | 2.8 |
| ZnO | 0.8 |

| Glass no. | 25 |
|---|---|
| $ZrO_2$ | 2.0 |
| $Ta_2O_5$ | 2.0 |

The optical values are:

$$n_e = 1.6571$$
$$\nu_e = 39.42$$
$$\Delta\nu_e = -3.9$$

Said glass No. 25 was investigated together with a commercial glass of the same optical position as to its chemical resistance according to a method published by H. BREDOW in the journal "Glass-Email-Keramo-Technik," Vol. 10, No. 8, pages 297-299 (1959).

Thereby, the results set forth in Table 7 were obtained.

Table 7

| | Solution residue (mg.) (reduced values) | |
|---|---|---|
| | Commercial glass | Glass No. 25 |
| with respect to 0.1 N $HNO_3$: | 193.0 | 63.0 |
| with respect to standard acetate: | 141.0 | 36.0 |

The measured values obtained show that the solution residue of glass No. 25 of this invention is several times lower than that of the commercial glass. In order to have a clear idea of the asserted value of these measurements, the glasses LaK 9 and SK 16, as very well known comparison glasses, are indicated with their corresponding solution residues. The term "reduced values" indicates the quotient resulting from the division of the solution residue in mg. and the specific gravity of the respective glass. "Standard acetate" is a standard acetate buffer solution of the pH is 4.62.

Table 8

| | Solution residue (mg.) (reduced values) | |
|---|---|---|
| Comparison glasses: | LaK 9 | SK 16 |
| with respect to 0.1 N $HNO_3$ | 52.7 | 107.5 |
| with respect to standard acetate: | 57.0 | 80.0 |

The manner in which melting of the glasses of the present invention will be explained and described by using as example the composition of glass No. 25: The thoroughly mixed substances (4.5 Kg.) are introduced in individual portions into a platinum crucible at a temperature of about 1300° C. After melting down, homogenization is effected with agitation for 60 minutes at about 1500° C. When complete freedom from bubbles has been obtained, the temperature of the melt is lowered to 1120° C. and poured into preheated steel molds.

It is understood, of course, that, in accordance with the present invention and the claims annexed hereto, not only the glass compositions as given in the Tables can be melted to yield the desired optical borate glasses of high chemical resistance but that other compositions will also yield, on melting the valuable borate glasses of this invention, such as, for instance, compositions which contain, in addition to the basic glass components boron trioxide, lead oxide, and aluminum oxide,
 up to 3.0 percent, by weight, of at least one of the oxides of the alkali metals lithium (Li), sodium (Na), and potassium (k), but, when present, not less than 0.2 percent, by weight, of said oxides; and/or
 up to 8.0 percent, by weight, of zinc oxide (ZnO), but, when present, not less than 0.8 percent, by weight, thereof; and/or
 up to 6.0 percent, by weight, of zirconium dioxide ($ZrO_2$), but, when present, not less than 2.0 percent, by weight, thereof; and/or
 up to 15.0 percent, by weight, of tantalum pentoxide ($Ta_2O_5$), but, when present, not less than 2.0 percent, by weight, thereof; and/or
 up to 16.0 percent, by weight, of an oxide selected from the group consisting of antimony trioxide ($Sb_2O_3$) and bismuthum trioxide ($Bi_2O_3$), but, when present, not less than 8.0 percent, by weight, thereof.

We claim:

1. An optical borate glass of high chemical resistance, with negative anomalous partial dispersion and refractive indices $n_e$ between 1.65 and 1.79 and Abbe numbers $\nu_e$ between 40 and 30, said glass consisting of
 between 26 and 39 percent, by weight, of boron trioxide ($B_2O_3$);
 between 32 and 57 percent, by weight, of lead oxide (PbO);
 between 5 and 19 percent, by weight, of aluminum oxide ($Al_2O_3$);
 up to 3.0 percent, by weight, of at least one of the oxides of the alkali metals lithium (Li), sodium (Na), and potassium (K), but when present, not less than 2.0 percent, by weight, of said oxides;
 up to 8.0 percent, by weight, of zinc oxide (ZnO), but, when present, not less than 0.8 percent, by weight, thereof; up to 600 percent; by weight, of zirconium dioxide ($ZrO_2$), but, when present, not less than 2.0 percent, by weight, thereof;
 up to 15.0 percent, by weight, of tantalum pentoxide ($Ta_2O_5$), but, when present, not less than 2.0 percent, by weight, thereof; and
 up to 16.0 percent, by weight, of a oxide selected from the group consisting of antimony trioxide ($Sb_2O_3$) and bismuthum trioxide ($Bi_2O_3$), but, when present, not less than 8.0 percent, by weight, thereof.

2. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$) and between 0.2 and 3.0 percent, by weight, of at least one of the oxides of the alkali metals selected from the group consisting of lithium (Li), sodium (Na), and potassium (K).

3. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$) and between 0.8 and 8.0 percent, by weight, of zinc oxide (ZnO).

4. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 0.2 and 3.0 percent, by weight, of at least one of the oxides of the alkali metals selected from the group consisting of lithium (Li), sodium (Na), and potassium (K), and between 0.8 and 8.0 percent, by weight, of zinc oxide (ZnO).

5. The glass of claim 1, consisting of between 26 and 39 percent, by weight, of boron trioxide ($B_2O_3$), between 32 and 57 percent, by weight, pf lead oxide (PbO), between 5 and 19 percent, by weight, of aluminum oxide ($Al_2O_3$) and between 2.0 and 6.0 percent, by weight, of zirconium dioxide ($ZrO_2$).

6. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 0.2 and 3.0 percent, by weight, of at least one of the oxides of the alkali metals selected from the group consisting of lithium (Li), sodium (Na), and potassium (K), and between 2.0 and 6.0 percent, by weight, of zirconium dioxide ($ZrO_2$).

7. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 0.8 and 8.0 percent, by weight, of zinc oxide (ZnO), and between 2.0 and 6.0 percent, by weight, of zirconium dioxide ($ZrO_2$).

8. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 0.2 and 3.0 percent, by weight, of at least one of the oxides of the alkali metals selected from the group consisting of lithium (Li), sodium (Na), and potassium (K), between 0.8 and 8.0 percent, by weight, of zinc oxide (ZnO), and between 2.0 and 6.0 percent, by weight, of zirconium dioxide ($ZrO_2$).

9. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), and between 2.0 and 15.0 percent, by weight, of tantalum pentoxide ($Ta_2O_5$).

10. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 0.2 and 3.0 percent, by weight, of at least one of the oxides of the alkali metals selected from the group consisting of lithium (Li), sodium (Na), and potassium (K), and between 2.0 and 15.0 percent, by weight, of tantalum pentoxide ($Ta_2O_5$).

11. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 0.8 and 8.0 percent, by weight, of zinc oxide (ZnO), and between 2.0 and 15.0 percent, by weight, of tantalum pentoxide ($Ta_2O_5$).

12. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 0.2 and 3.0 percent, by weight, of at least one of the oxides of the alkali metals selected from the group consisting of lithium (Li), sodium (Na), and potassium (K), between 0.8 and 8.0 percent, by weight, of zinc oxide (ZnO), and between 2.0 and 15.0 percent, by weight, of tantalum pentoxide ($Ta_2O_5$).

13. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 2.0 and 6.0 percent, by weight, of zirconium dioxide ($ZrO_2$), and between 2.0 and 15.0 percent, by weight, of tantalum pentoxide ($Ta_2O_5$).

14. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 0.2 and 3.0 percent, by weight, of at least one of the oxides of the alkali metals selected from the group consisting of lithium (Li), sodium (Na), and potassium (K), between 2.0 and 6.0 percent, by weight, of zirconium dioxide ($ZrO_2$) and between 2.0 and 15.0 percent, by weight, of tantalum pentoxide ($Ta_2O_5$).

15. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 0.8 and 8.0 percent, by weight, of zinc oxide (ZnO), between 2.0 and 6.0 percent, by weight, of zirconium dioxide ($ZrO_2$), and between 2.0 and 15.0 percent by weight, of tantalum pentoxide ($Ta_2O_5$).

16. The glass of claim 1, consisting of between 26 and 39 percent, by weight, of boron trioxide ($B_2O_3$), between 32 and 57 percent, by weightm of lead oxide (PbO), between 5 and 19 percent, by weight, of aluminum oxide ($Al_2O_3$), between 0.2 and 3.0 percent, by weight, of at least one of the oxides of the alkali metals selected from the group consisting of lithium (Li), sodium (Na), and potassium (K), between 0.8 and 8.0 percent, by weight, of zinc oxide (ZnO), between 2.0 and 6.0 percent, by weight, of zirconium dioxide ($ZrO_2$), and between 2.0 and 15.0 percent, by weight, of tantalum pentoxide ($Ta_2O_5$).

17. The glass of claim 1, consisting of between 26 and 39 percent, by weight, of boron trioxide ($B_2)_3$), between 32 and 57 percent, by weight, of lead oxide (PbO), between 5 and 19 percent, by weight, of aluminum oxide ($Al_2O_3$), and between 8.0 and 16.0 percent, by weight, of at least one oxide selected from the group consisting of antimony trioxide ($Sb_2O_3$) and bismuthum trioxide ($Bi_2O_3$).

18. The glass of claim 1, consisting of between 26 and 39 percent, by weight, of boron trioxide ($B_2O_3$), between 32 and 57 percent, by weight, of lead oxide (PbO), betweeen 5 and 19 percent, by weight, of aluminum oxide ($Al_2O_3$), between 2.0 and 6.0 percent, by weight, of zirconium dioxide ($ZrO_2$), and between 8.0 and 16.0 percent, by weight, of at least one oxide selected from the group consisting of antimony trioxide ($Sb_2O_3$) and bismuthum trioxide ($Bi_2O_3$).

19. The glass of claim 1, consisting of between 26 and 39 percent, by weight, or boron trioxide ($B_2O_3$), between 32 and 57 percent, by weight, of lead oxide (PbO), between 5 and 19 percent, by weight, of aluminum oxide ($Al_2O_3$), between 2.0 and 15.0 percent, by weight, of tantalum pentoxide $Ta_2O_5$), and between 8.0 and 16.0 percent, by weight, of at least one oxide selected from the group consisting of antimony trioxide ($Sb_2O_3$) and bismuthum trioxide ($Bi_2O_3$).

20. The glass of claim 1, consisting of between 26 and 39 percent, by weight, of boron trioxide ($B_2O_3$), between 32 and 57 percent, by weight, of lead oxide (PbO), between 5 and 19 percent, by weight, of aluminum oxide ($Al_2O_3$), between 2.0 and 6.0 percent, by weight, of zirconium dioxide ($ZrO_2$), between 2.0 and 15.0 percent, by weight, of tantalum pentoxide ($Ta_2O_5$), and between 8.0 and 16.0 percent, by weight, of at least one oxide selected from the group consisting of antimony trioxide ($Sb_2)_3$) and bismuthum trioxide ($Bi_2O_3$).

21. The glass of claim 1, consisting of between 26 and 39 percent, by weight, of boron trioxide $B_2O_3$), between 32 and 57 percent, by weight, of lead oxide (PbO), between 5 and 19 percent, by weight, of aluminum oxide ($Al_2O_3$), between 0.2 and 3.0 percent, by weight, of at least one of the oxides of the alkali metals selected from the group consisting of lithium (Li), sodium (Na), and potassium (K), between 0.8 and 8.0 percent, by weight, of zinc oxide (ZnO), between 2.0 and 6.0 percent, by weight, of zirconium dioxide ($ZrO_2$), between 2.0 and 15.0 percent, by weight, of tantalum pentoxide ($Ta_2O_5$), and between 8.0 and 16.0 percent, by weight, of at least one oxide selected from the group consisting of antimony trioxide ($Sb_2O_3$) and bismuthum trioxide ($Bi_2O_3$).

22. An optical borate glass of high chemical resistance of the following composition:

| Component | %, by weight |
|---|---|
| Boron trioxide ($B_2O_3$) | 34.7, |
| lead oxide(PbO) | 39.0, |
| aluminum oxide($Al_2O_3$) | 18.5, |
| lithium oxide($Li_2O$) | 0.2, |
| sodium oxide ($Na_2O$) | 2.8, |
| zinc oxide(ZnO) | 0.8, |
| zirconium dioxide($ZrO_2$) | 2.0 |
| tantalum pentoxide($Ta_2O_5$) | 2.0, | said glass having the following optical values:
$$n_e = 1.6571$$
$$\nu_e = 39.42$$
$$\Delta\nu_e = -3.9.$$

23. In a process of manufacturing a glass of the composition of claim 1, the steps which consist essentially in
a. melting a mixture of the oxides consisting of between 26 and 39 percent, by weight, of boron trioxide ($B_2O_3$), between 32 and 57 percent, by weight, of lead oxide (PbO), and between 5 and 19 percent, by weight, of aluminum oxide ($Al_2O_3$) up to 3.0 percent, by weight, of at least one of the oxides of the alkali metals lithium (Li), sodium (Na), and potassium (K), but, when present, not less than 2.0 percent, by weight, of said oxides; up to 8.0 percent, by weight, of zinc oxide (ZnO), but, when present, not less than 0.8 percent, by weight, thereof; up to 6.0 percent, by weight, of zirconium dioxide ($ZrO_2$), but, when present, not less than 2.0 percent, by weight, thereof; up to 15.0 percent, by weight, of tantalum pentoxide ($Ta_2O_5$), but, when present, not less than 2.0 percent, by weight, thereof; and up to 16.0 percent, by weight, of an oxide selected from the group consisting of antimony trioxide ($Sb_2O_3$) and bismuthum trioxide ($Bi_2O_3$), but, when present, not less than 8.0 percent, by weight, thereof at a temperature between about 1300°C. and about 1500°C.,
b. homogenizing the molten mixture to produce a bubble-free melt,
c. cooling said mixture to about 1120°C., and
d. casting the melt into preheated molds.

* * * * *

UNITED STATES PATENT OFFICE
CERTIFICATE OF CORRECTION

Patent No. 3,929,495     Dated December 30, 1975

Inventor(s) HEINZ BROEMER and NORBERT MEINERT

It is certified that error appears in the above-identified patent and that said Letters Patent are hereby corrected as shown below:

Column 4, line 11: The comma between "nium" and "dioxide" should be cancelled.

Column 4, last Table, Glass No. 25. In the heading of said Table "Glass no." should read -- Glass No.: --.

Column 5, Table continued: "Glass no." should read -- Glass No.: --

Column 5, line 41: "is" should read -- of --.

line 52: After "invention" there should be inserted -- is effected --.

line 60: Before "poured" there should be inserted -- the melt is --.

Column 6, line 39: The words -- up to -- should start on a new line.

line 39: "600 percent;" should read -- 6.00 percent, --.

Column 7, line 7: "pf" should read -- of --.

Column 8, line 30: A comma --,-- should be inserted between "percent" and "by".

PO-1050
(5/69)

UNITED STATES PATENT OFFICE
CERTIFICATE OF CORRECTION

Patent No. 3,929,495   Dated December 30, 1975

Inventor(s) HEINZ BROEMER and NORBERT MEINERT

It is certified that error appears in the above-identified patent and that said Letters Patent are hereby corrected as shown below:

Page 2 of 2

Column 8, line 34: "weightm" should read -- weight, --.

line 45: "$(B_2)_3)$ should read -- $(B_2O_3)$ --.

line 62: "or" should read -- of -- .

Column 9, line 14: "$B_2O_3)$" should read -- $(B_2O_3)$ --.

Column 10, line 16: A comma -- , -- should be inserted before "up to ".

Signed and Sealed this thirteenth Day of April 1976

[SEAL]

Attest:

RUTH C. MASON
Attesting Officer

C. MARSHALL DANN
Commissioner of Patents and Trademarks